(12) United States Patent
Mayes et al.

(10) Patent No.: US 7,178,608 B2
(45) Date of Patent: Feb. 20, 2007

(54) WHILE DRILLING SYSTEM AND METHOD

(75) Inventors: James C. Mayes, Sugar Land, TX (US); Mario A. Araya, Sugar Land, TX (US); Richard Edward Thorp, Richmond, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 267 days.

(21) Appl. No.: 10/709,802

(22) Filed: May 28, 2004

(65) Prior Publication Data

US 2005/0016771 A1 Jan. 27, 2005

Related U.S. Application Data

(63) Continuation-in-part of application No. 10/708,893, filed on Mar. 30, 2004.

(60) Provisional application No. 60/481,143, filed on Jul. 25, 2003.

(51) Int. Cl.
*E21B 47/01* (2006.01)
*E21B 47/06* (2006.01)

(52) U.S. Cl. .................. 175/48; 175/50; 166/250.01; 73/152.22; 73/152.46; 73/152.52

(58) Field of Classification Search ............ 175/48, 175/50, 40, 41; 166/250.01; 73/152.43, 73/152.46, 152.03, 152.19, 152.52, 152.21, 73/152.22

See application file for complete search history.

(56) References Cited

U.S. PATENT DOCUMENTS

| 3,746,106 | A | 7/1973 | McCullough et al. |
|---|---|---|---|
| 3,831,138 | A | 8/1974 | Rammner |
| 4,787,463 | A | 11/1988 | Geller et al. |
| 4,899,112 | A | 2/1990 | Clark et al. |
| 5,061,849 | A | 10/1991 | Meisner et al. |
| 5,253,721 | A | 10/1993 | Lee |
| 5,357,483 | A | 10/1994 | Innes |
| 5,517,464 | A | 5/1996 | Lerner et al. |
| 5,589,825 | A | 12/1996 | Pomerleau |
| 5,725,061 | A * | 3/1998 | Van Steenwyk et al. .... 175/104 |
| 5,740,126 | A | 4/1998 | Chin et al. |

(Continued)

FOREIGN PATENT DOCUMENTS

EP 0900917 A1 3/2001

(Continued)

*Primary Examiner*—Kenneth Thompson
(74) *Attorney, Agent, or Firm*—Jennie (JL) Salazar; James L. McEnaney

(57) ABSTRACT

A while drilling system and method for determining downhole parameters is provided. The system includes a retrievable while drilling tool positionable in a downhole drilling tool, a sensor chassis and at least one sensor. The while drilling tool is positionable in the downhole drilling tool and has a first communication coupler at an end thereof. The sensor chassis is supported in the drilling tool. The sensor chassis has a second communication coupler at an end thereof for operative connection with the first communication coupler. The sensor is positioned in the chassis and is adapted to measure internal and/or external parameters of the drilling tool. The sensor is operatively connected to the while drilling tool via the communication coupler for communication therebetween. The sensor may be positioned in the while drilling tool and retrievable with the drilling tool. Preferably, the system is operable in high temperature and high pressure conditions.

26 Claims, 8 Drawing Sheets

U.S. PATENT DOCUMENTS

| | | |
|---|---|---|
| RE35,790 E | 5/1998 | Pustanyk et al. |
| 5,794,719 A | 8/1998 | Holloway |
| 6,026,915 A * | 2/2000 | Smith et al. ............... 175/50 |
| 6,064,210 A | 5/2000 | Sinclair |
| 6,280,874 B1 | 8/2001 | Hensley et al. |
| 6,341,498 B1 | 1/2002 | DiFoggio |
| 6,349,778 B1 | 2/2002 | Blair et al. |
| 6,367,323 B1 * | 4/2002 | Camwell et al. ......... 73/152.52 |
| 6,523,609 B1 | 2/2003 | Miszewski |
| 6,564,883 B2 * | 5/2003 | Fredericks et al. ........... 175/50 |
| 6,577,244 B1 | 6/2003 | Clark et al. |
| 6,634,427 B1 | 10/2003 | Turner et al. |
| 6,856,255 B2 * | 2/2005 | Chalitsios et al. ....... 340/854.4 |
| 2002/0005282 A1 | 1/2002 | Holbert et al. |
| 2002/0104328 A1 | 8/2002 | DiFoggio et al. |
| 2003/0072218 A1 | 4/2003 | Smith |
| 2003/0080743 A1 | 5/2003 | Das et al. |
| 2003/0085039 A1 | 5/2003 | DiFoggio |
| 2003/0137430 A1 | 7/2003 | Chalitsios et al. |
| 2003/0183384 A1 | 10/2003 | Das et al. |
| 2005/0016770 A1 | 1/2005 | Mayes et al. |

FOREIGN PATENT DOCUMENTS

| | | |
|---|---|---|
| GB | 2242462 | 10/1991 |
| WO | WO00/47869 | 8/2000 |

* cited by examiner

WHILE DRILLING SYSTEM AND METHOD

CROSS REFERENCE TO RELATED APPLICATIONS

This application is a continuation-in-part of U.S. application No. 10/708,893, filed on Mar. 30, 2004, which claims priority to U.S. Provisional Application Ser. No. 60/481143 filed on Jul. 25, 2003.

FEDERAL RESEARCH STATEMENT

This invention was made with Government support under Cooperative Agreement No. DE-FC26-O3NT41835 awarded by the Department of Energy (DOE). The Government has certain rights in this invention.

BACKGROUND OF INVENTION

1. Field of the Invention

The present invention relates generally to downhole tools used in performing wellbore operations. More specifically, the present invention relates to techniques for determining downhole parameters via a retrievable downhole while-drilling tool.

2. Background of the Related Art

The harvesting of hydrocarbons from subterranean formations involves the drilling of wellbores into the earth. To create the wellbore, a downhole drilling tool is suspended from a drilling rig and advanced into the earth via a drill string. During the drilling operation, it is desirable to obtain information about the downhole conditions. Such information is useful, for example, in locating desirable formations, preventing potential problems and improving the drilling operation.

Downhole drilling tools are typically provided with a bottom hole assembly (BHA) that consists of one or more drill collars with various instruments therein. One such instrument (or combination of instruments) typically positioned in the BHA is a measurement while drilling (MWD) or logging while drilling (LWD) tool (referred to collectively herein as while drilling or WD tools). WD tools typically include a combination of sensors, telemetry devices, power supplies and/or other instruments, for performing various downhole functions, such as taking downhole measurements, compiling information about the drilling operation and communicating with the surface. Examples of existing MWD tools and systems are described in U.S. Pat. No. 5,357,483 assigned to Halliburton, U.S. Pat. No. 5,517,464 assigned to the assignee of the present invention and U.S. application No. 20030080743 assigned to Baker Hughes. Examples of LWD tools are described in U.S. Pat. No. 4,899,112, assigned to the assignee of the present invention. Some such WD tools are also retrievable and replaceable from the downhole drilling tool as described, for example, in U.S. Pat. No. 6,577,244, assigned to the assignee of the present invention. At least some such WD tools may be vulnerable to leakage, seal failure about orifices extending through the drill collar and/or otherwise lack reliability or performance capabilities in a variety of wellbore environments.

Current WD tool and associated instruments (WD systems) are typically housed within steel, cylindrical and hollow drill collars to protect them from moisture, temperature, chemical and/or pressure exposure. However, it is desirable to position certain instruments, such as sensors, in such a way that they are capable of taking more precise measurements without increasing the potential risk of damage and/or exposure to the remainder of the WD system. The risk of leakage and/or damage may increase in situations where ports extend through the drill collars and into the WD system. It is, therefore, desirable that the downhole drilling tool be further capable of one or more of the following, among others: retrievability from the drilling tool, resetability in the drilling tool, wireless communication between instruments, isolation of certain components from wellbore conditions, retrieval of certain components to the surface for replacement, maintenance and/or adjustment and/or resistance to leakage. Moreover, such a system preferably optimizes drilling performance, reduces drilling time and assists in increasing rate of penetration and accuracy of well placement in drilling environments.

It is further desirable that the drilling tool be capable of performing in even extremely harsh wellbore conditions. The downhole drilling of wellbores, such as oil wells, involves extreme operating conditions, such as high temperatures, high pressure and rigorous physical impact. Much of the drilling occurs at extreme depths into the Earth's' surface or deep below the sea bottom. The environment encountered by downhole oil exploration tools can be very severe. Temperatures up to and in excess of 200 degree C. and pressures up to $1.38 \times 10^8$ Pa are not uncommon. Consequently, producers of oil exploration tools seek to design robust tools that can operationally sustain harsh conditions for extended lengths of time.

Perhaps the most challenging of all conditions is to design electronics that can reliably operate in high temperature environments. Standard electronic components are usually rated to operate only up to approximately 125 degree C. Thus, it becomes necessary to create or experimentally find electric components that can survive the high temperatures existing downhole.

Various downhole instruments have been developed to deal with certain high temperature or high pressure conditions. For example, there are MWD tools specified to 150 degrees C. that provide real-time inclination and gamma ray. There are also MWD tools specified to 175 degrees C. that can operate under certain conditions for certain applications. However, no known commercial MWD tools that are capable of operating above 175 degrees C. for extended periods of time offer desirable operational features, such as real-time gamma ray, retrievability and resetability, as well as vibration detection.

Attempts have been made to develop downhole tools with desirable capabilities for use in high temperature conditions. By way of example, one downhole tool has been rated at 180 degrees C. with survivability to 200 degrees C., but lacks continuous inclination and fishability. The reliability of such a tool has not yet been verified as operational in wells exceeding 170 degrees C. Another tool is rated to 200 degrees C., but it lacks gamma ray, continuous inclination, annular pressure and fishability, and is purported to suffer from poor reliability and low up-hole communication rate. In addition the electronics are typically discarded once they exceed 175 degrees C., this despite the use of 225 degrees C. silicon-on-insulator (SOI) components.

Electronic components are considered one of the major hurdles to high temperature MWD tools as there are only a few 200 degrees C. components commercially available. Those that are available typically fall into three major categories: (1) legacy ceramic components developed mostly for the military market that serendipitously work at high temperature, (2) multi-chip modules developed (or that can be developed) by end users and others using die known to work at high temperatures, and (3) a few very basic and very expensive silicon-on-insulator (SOI) components developed specifically for the 200 degrees C. or greater market.

Attempts are being made to develop a process capable of producing very high temperature digital and mixed analog/digital devices. While such attempts offer exciting prospects for the long term, products remain unavailable for commercial processes. Individual components have yet to be developed, and pose significant costs.

A need also remains for a new retrievable and resetable WD tool. The capability for retrievability and repeatability provides a significant improvement over existing technologies since tools that fail in harsh environments can be removed and replaced with a wireline, obviating the need for a long and expensive pipe-trip out of the hole and back in again.

It is desirable that the tool be capable of performing continuous inclination, downhole vibration detection, annular pressure and gamma ray detection, real time annular and/or internal pressure while drilling, real time continuous inclination, real time gamma ray detection, real time vibration monitoring, high speed operation, high power system controller/signal processing, high speed data acquisition, gamma ray measurement and acquisition, and/or pressure measurement and/or resealing capability for pressure acquisition, all for extended periods of time and under even high-temperature, high-pressure conditions. It is further desirable that such a tool and related components, such as sensors, electronics, packaging, materials and pressure housings, be operable in the areas of high temperature of at least about 175 degrees C., and preferably above at least about 200 degrees C. at pressures at least about 20 Kpsi (1406.5 kg/cm).

A need therefore exists for a WD system with one or more of these advanced capabilities.

SUMMARY OF INVENTION

In at least one aspect, the present invention relates to a while drilling system for determining downhole parameters. The system is positioned in a downhole drilling tool suspended in a wellbore. The system comprises a retrievable while drilling tool, a sensor chassis and at least one sensor. The while drilling tool is positionable in the downhole drilling tool and has a first communication coupler at an end thereof. The sensor chassis is supported in the drilling tool. The sensor chassis has a second communication coupler at an end thereof for operative connection with the first communication coupler. The sensor is positioned in the chassis and is adapted to measure internal and/or external parameters of the drilling tool. The sensor is operatively connected to the while drilling tool via the communication coupler for communication therebetween.

In another aspect, the invention relates to a while drilling system for determining downhole parameters. The system is positioned in a downhole drilling tool suspended in a wellbore. The system comprises a retrievable while drilling tool, a landing collar and a flow restrictor. The while drilling tool is positionable in the downhole drilling tool and has at least one sensor therein. The landing collar is positioned in the drill collar. The landing collar has a pocket adapted to receive the while drilling tool. The landing collar has an orifice therethrough in fluid communication with the wellbore via an aperture through the downhole drilling tool. The flow restrictor is positioned in the pocket. The flow restrictor is adapted to selectively permit the flow of fluid into the pocket via the orifice.

In yet another aspect, the invention relates to a method of measuring downhole parameters while drilling. The method includes advancing a downhole drilling tool into the earth to form a wellbore, the downhole drilling tool having a chassis therein with at least one sensor therein, seating a while drilling tool in the downhole drilling tool, operatively connecting the while drilling tool to the chassis for wireless communication between the sensors and the while drilling tool and sensing wellbore parameters via the at least one sensor.

Finally, in another aspect, the invention relates to a method of measuring downhole parameters while drilling. The method includes advancing a downhole drilling tool into the earth to form a wellbore, the downhole drilling tool having a landing collar therein, seating a while drilling tool in a pocket in the landing collar, the while drilling tool having at least one sensor therein, selectively establishing fluid communication between the pocket and the wellbore via an orifice in one of the downhole tool, the landing collar and combinations thereof and sensing wellbore parameters in the pocket via the at least one sensor.

A while drilling system of a downhole drilling tool suspended from a drilling rig via a drill string is provided. The downhole drilling tool is positioned in a wellbore penetrating a subterranean formation. The system includes at least one drill collar having a tubular sidewall defining a passage therein for the flow of drilling mud therethrough, a while drilling tool supported in the passage of the at least one drill collar and selectively retrievable therefrom and at least one external sensor positioned in the sidewall of the drill collar and isolated from the passage. The at least one sensor is exposed to the wellbore for measurement thereof and adapted to wirelessly communicate with the while drilling tool.

A method of performing while drilling is provided. The method involves advancing a downhole drilling tool into the earth to form a wellbore, sensing wellbore parameters via external sensor(s) positioned in a pocket of the tubular sidewall, wirelessly passing signals between the WD tool and the external sensor(s) and selectively retrieving the WD tool from the downhole drilling tool. In some embodiments, the external sensor remains in the drilling tool upon retrieval of the WD tool. In other embodiments, the external sensor is retrieved with the WD tool. The downhole drilling tool includes at least one drill collar with a WD tool therein. The drill collar has a tubular sidewall defining a passage therein for the flow of drilling mud therethrough. The external sensor(s) are preferably isolated from the passage.

A sensor system for determining downhole parameters is also provided. The system is positioned in a downhole drilling tool suspended in a wellbore below a drilling rig. The system is provided with a retrievable while drilling tool and at least one sensor. The while drilling tool is positioned in the downhole drilling tool. The drilling tool has an internal passage therethrough for the passage of mud. The at least one sensor is positioned in a drill collar of the downhole drilling tool and isolated from the passage. The at least one sensor is adapted to measure wellbore parameters. The pressure sensor is adapted to communicate with the while drilling tool whereby signals are passed therebetween.

Preferably systems operate in high temperature, high pressure conditions, such as above about 200 degrees C. and about 20 Kpsi (1406.5 kg/cm). The system may be provided with a system controller, a signal processor, a data acquisition system and sensors. The sensors may be any sensors, such as a downhole vibration detection, D&I tool, annular pressure (while drilling), gamma ray and continuous inclination. The sensors are adapted to measure one of gamma ray, shock, vibration, internal or external pressure, temperature, sonic speed, arrival time and combinations thereof. The sensor may be positioned inside the downhole drilling tool and adapted to measure one of gamma ray, shock, vibration, pressure, temperature and combinations thereof. The system may include a while drilling signal assembly in the while drilling tool and a sensor signal assembly in the sensor for wirelessly passing signals therebetween. The signals may be one of command, communication, power and other signals.

The signal and sensor assemblies are preferably provided with one of legacy ceramics, silicon on insulator, multichip modules, field programmable gate array, and combinations thereof. The system may also be provided with a control system including a controller, a processor, a data acquisition module, a transmitter, a receiver, and/or a communication circuit. The sensors may include a transmitter, a receiver, a gauge, and/or a power source. The power source may be chargeable by the while drilling tool. The system may also be provided with a locking mechanism adapted to orient the while drilling tool in the drill collar.

The system preferably includes continuous direction and inclination capabilities. It is also preferable that the system take continuous measurements in real time and/or perform in high temperature and pressure conditions.

Other aspects and advantages of the invention will be apparent from the following description and the appended claims.

BRIEF DESCRIPTION OF DRAWINGS

So that the above recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
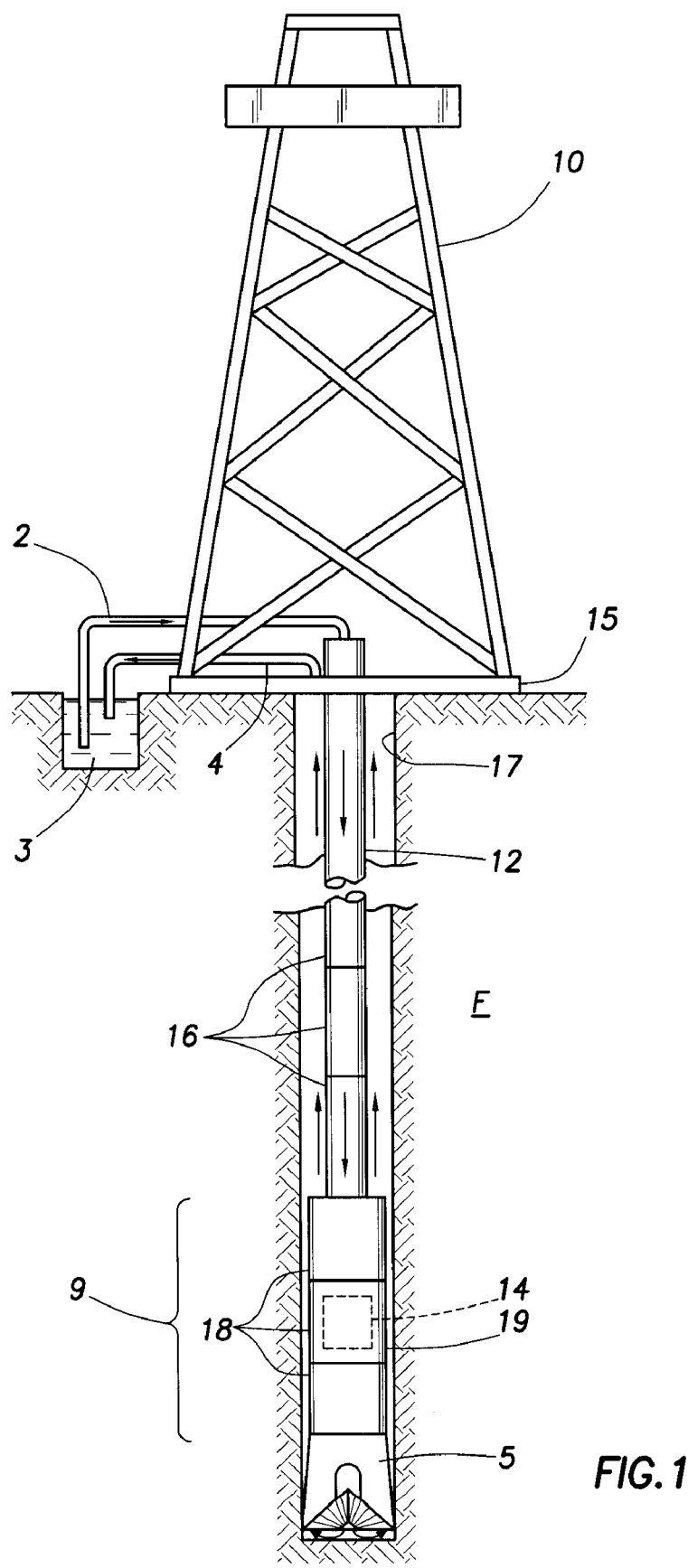
FIG. 1 is a schematic view of a downhole drilling tool suspended from a drilling rig and into a wellbore, the downhole drilling tool having a while drilling system therein.

FIG. 1 is a schematic diagram of a drilling rig 10 and a drill string 12. The drilling rig is mounted on the rig floor 15 and is connected to and supports the drill string through an intricate system of cables and pulleys (not shown). The drill string is suspended from the rig 10 and into a wellbore 17 penetrating a formation F. The drill string includes drill pipes 16 (three are shown in FIG. 1), a bottom hole assembly (BHA) 9 and a drill bit 5 at a lower end thereof. Typically, only a portion of the weight of the drill string is supported at any one time by the formation. The rest is typically kept in suspension by the drilling rig, the cables and pulleys and other supporting components. Drilling of the wellbore commences when the bit is made to turn by various means, either by turning the rig floor rotary table (not shown), or by a drilling motor (not shown) connected between the drill bit and the rest of the drill string.

During the drilling operation a special fluid colloquially called "mud" 3 is pumped from a pit via a pipe 2, through the drill string 12, the BHA 9 and out the drill bit 5. The fluid flows out of the drill bit and is forced up the wellbore through a space, or annulus 7, in the wellbore between the tool and the wellbore wall and back through pipe 4 as shown by the arrows. The flow of drilling fluid through the tool is used to provide power and enable communication via mud pulse telemetry systems as will be appreciated by one of skill in the art. The use of such downhole drilling tools is described for example in U.S. Pat. No. 5,357,483, assigned to Halliburton and U.S. Pat. No. 5,517,464 assigned to the assignee of the present invention. Preferably the telemetry system used is compatible with existing surface demodulation equipment. It is also preferable that the real-time drilling coupled with an intelligent wellsite decision-making system be provided.

Figure 2:
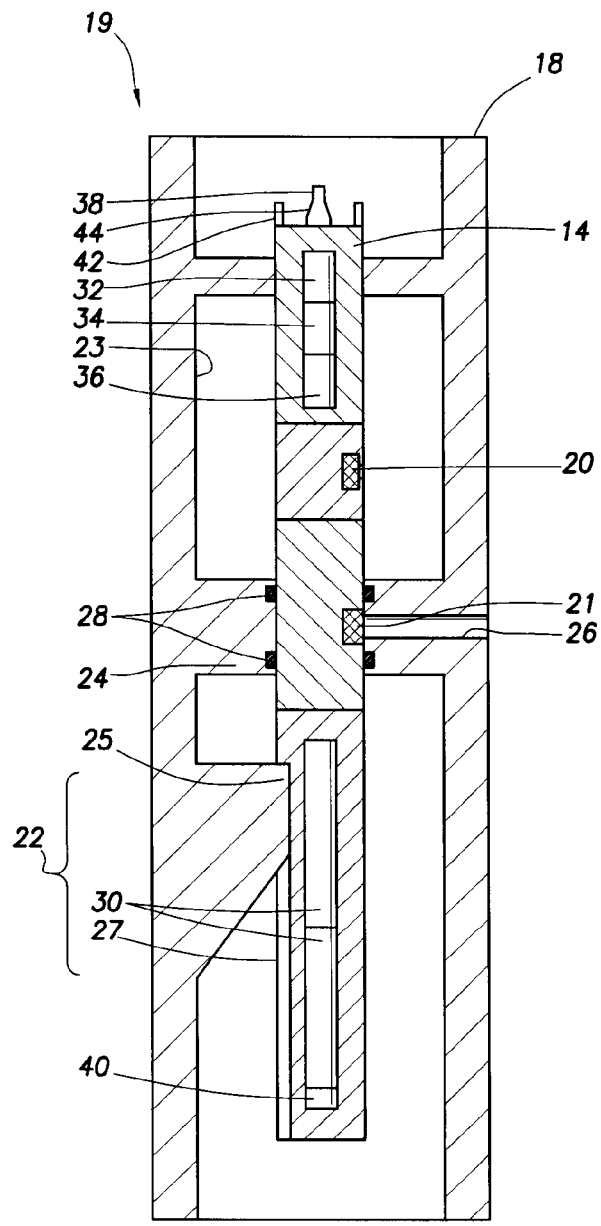
FIG. 2 is a longitudinal crossectional view of the while drilling system of FIG. 1.

The BHA 9 of FIG. 1 includes drill collars 18 (one or more may be used) containing downhole instruments therein used to perform a variety of downhole operations. One group of such instruments is referred to generally as a while drilling or WD system 19. The WD system includes a WD tool 14, such as a logging while drilling (LWD), measurement while drilling (MWD) or other while drilling tool, and associated sensors (FIG. 2). The WD tool 14 is used to perform downhole while drilling functions, such as taking downhole measurements, communicating with the surface, among others. The WD tool 14 communicates with the sensors to perform downhole measurements. The WD tool may be used, for example, to determine direction, inclination, gamma ray, pressure, shock, vibration, sonic speed, seismic arrival time and/or other naturally occurring or man made phenomena. Associated processors and computers may also be incorporated to process additional information.

Preferably, the sensors are rated for high temperature and pressure and can generate measurements in real-time and/or recorded mode. Various sensors, such as Long-life Gamma Ray (GR), may be used. Some such sensors operate for a shorter period of time at 200 degrees C. Such sensors are preferably modified to provide measurements in this high temperature application. Sensors to detect pressure at high temperatures may also be used. It is desirable that such sensors meet accuracy and survivability requirements for the 200 degrees C. (at least) drilling environment.

The WD tool 14 may be inserted into the BHA prior to connecting the drill collar 18 to the other drill collars, the pipe, the drill bit and the drilling motor when present. Alternatively, the WD tool may be lowered with a cable connected to a mechanical connector, sometimes called a wireline connector (not shown). The WD tool is lowered through the drill string 16 to the drill collar 18 after the collar is placed in the wellbore. The WD system can be removed and another WD system can be set in its place via a cable after the drill collar has been lowered into the wellbore. Retrieval systems for WD tools are described, for example, in U.S. Pat. No. 6,577,244 assigned to the assignee of the present invention, the entire contents of which is hereby incorporated by reference. Techniques for accommodating the tool's fishability and resetability requirements at high temperature and high pressure are provided.

FIG. 2 illustrates a WD system usable as the WD system 19 of FIG. 1. This WD system includes the drill collar 18, the WD tool 14, internal sensor 20 and external sensor 21. The WD Tool in this example acquires information from several sources, such as the internal sensor 20 and the external sensor 21. Conventional WD tools may be used in the WD system as will be appreciated by one of skill in the art. Examples of WD tools are described, for example, in U.S. Pat. No. 5,677,244, assigned to the assignee of the present invention, the entire contents of which is hereby incorporated by reference.

The sensors are used to take downhole measurements, such as pressure. The sensor may be any type of sensor, such as a strain gauge. These sensors gather information and communicate the information to the WD tool. In the case of the internal pressure measurement, pressure communicates through the passage 23 extending through the drill collar and to the internal sensor 20 embedded in the WD tool. The internal sensor 20 is exposed to the pressure of the drilling mud passing through a passage 23 between the tool and the drill collar.

In the case of external pressure measurement, pressure communicates through an orifice 26 extending through the side of the drill collar 18 and sleeve 24, and to the external sensor 21 embedded in the WD tool. The external sensor is positioned in the tool adjacent sleeve 24 between the WD tool and the drill collar. The external sensor is exposed to wellbore fluids and pressures exterior to the drill collar via the orifice 26. Pressure seals 28, in the form of O-rings in this example, are preferably provided to keep the external pressure from communicating with the internal pressure.

The WD tool is preferably provided with a locking mechanism 22 adapted to secure the Tool in place within a drill collar. The locking mechanism is preferably a mechanical interface between the drill collar 18 and the WD tool 14. The locking mechanism includes a keyway 27, or recess, in the WD tool and a corresponding key 25 positioned on the WD tool. The key and the receiver operatively connect to seat and secure the Tool in the drill collar. The key is also used to align the WD tool within the drill collar and orient the WD system thereto. The sensor 21 is preferably connected to the drill collar 18 opposite key 25. Other embodiments of this invention could incorporate the sensor within the key, or there could be multiple locations or multiple sensors, located in other locations within the tool/drill collar assembly.

The locking mechanism may be activated when the Tool is inserted into or removed from the drill collar at the surface. Alternatively, the locking mechanism may be activated when the WD tool is inserted into or removed from the drill collar when downhole. This tool may be removed with the use of a wire line cable and attachment device and replaced by another tool using that same wire line and attachment device. Existing locking mechanisms are commercially available for insertion, removal and reseating of existing direction & inclination (D&I) tools. Such locking mechanism may be adapted for use in high temperature and/or high pressure environments. This tool is preferably capable of making this mechanical connection at high temperatures and high pressures.

FIG. 2 also depicts various other components that may be provided integrally with or in conjunction with the WD system 19 and/or WD tool 14. For example, the WD tool is depicted as having a power source, such as batteries 30 and/or electrical power generation 32. The batteries may be specially designed, or off the shelf batteries. A generator, such as a commercially available generator that uses mudflow to produce electricity may be used. Preferably, any power source used is rated for high temperature and pressure. For example, the system may operate using a high temperature power supply.

The WD tool is also provided with a system controller and/or signal processor 34 and data acquisition system 36. The data acquisition system preferably includes sensors, such as a direction & inclination sensor, a gamma ray sensor, a vibration sensor and a temperature sensor. Other sensors may also be provided.

Uphole and downhole communications connector 38 and 40, respectively, are also preferably provided. A wireline connector 42 and uphole telemetry 44 can also be used to assist with retrieval of the WD tool and/or establishing communication with the surface. These and other downhole instruments may also be provided to perform a variety of power, communication, processing and other operations. Preferably, components for the downhole tool are rated for high temperature, shock and pressure usage.

Figure 3:
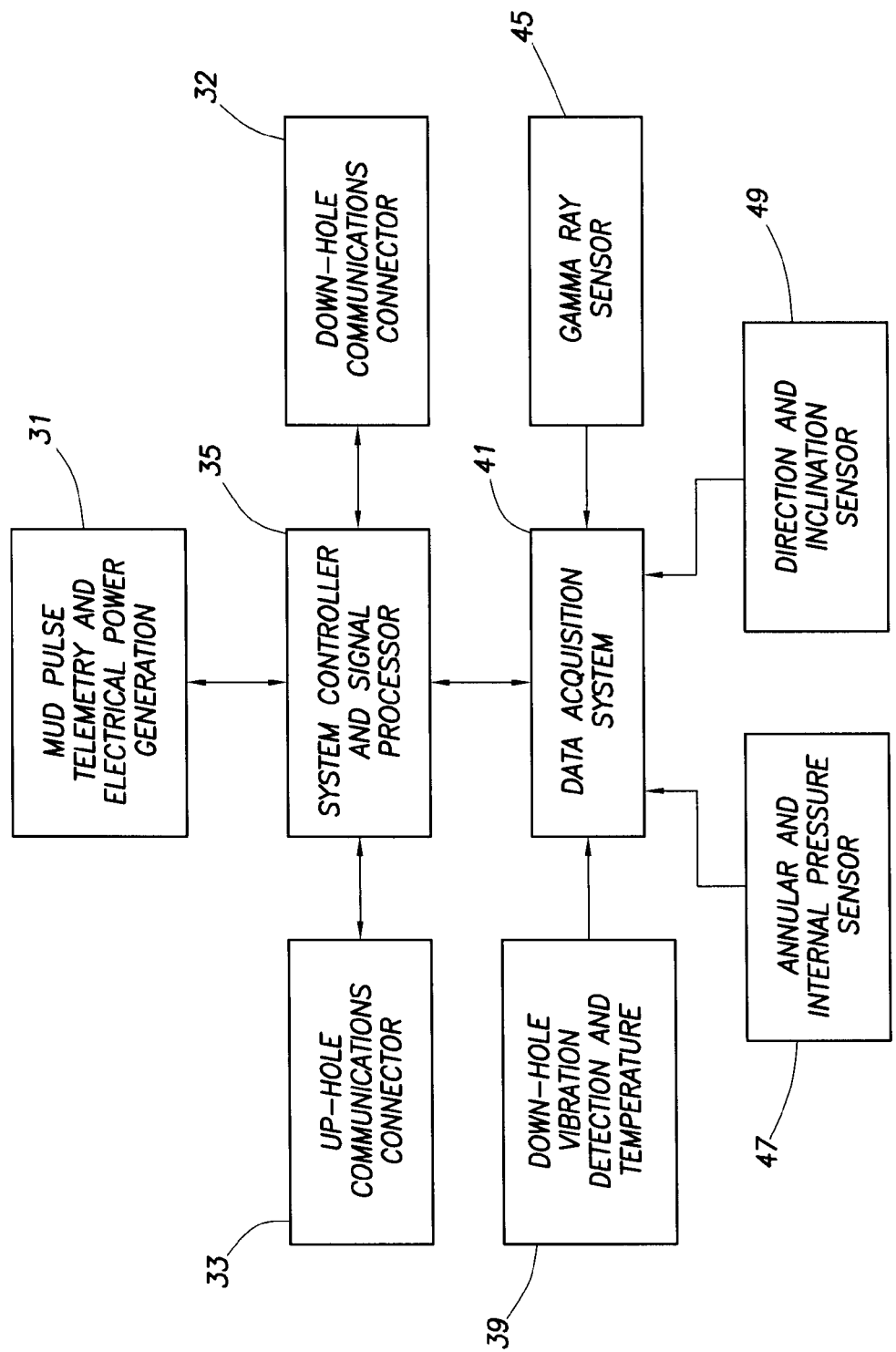
FIG. 3 is a schematic view of the components of the while drilling system of FIG. 2.

FIG. 3 is a schematic diagram depicting the operation of the WD system. The WD system preferably includes a system controller and a signal processor 35, a data acquisition system 41, an up-hole communications connector 33, a downhole communications connector 37, mud pulse telemetry and electrical power generation 31 and various sensors (39, 45, 41, 49). These components may be integral with the WD tool or operatively connected thereto. Some such components form part of other instruments positioned in various other portions of the downhole tool. As depicted in FIG. 3, the sensors include a gamma ray sensor 45, a D&I sensor 49, annular and internal pressure sensor 47, a temperature sensor, and a downhole vibration and temperature detector 39. However, other instruments are also envisioned.

As depicted, the sensors gather and send data to the data acquisition system 41. The data acquisition system communicates with the system controller and signal processor. The system controller may send commands to the data acquisition system to activate the sensors and collect information. The signal processor collects and compiles information received from the data acquisition system. The information may then be sent to the surface and/or the rest of the tool via the uphole and downhole communications connectors. Other components may be positioned in or around the WD system that may also be operated. The telemetry system and electrical power generation may be used to provide communication and power to the system controller and on to the sensors and/or connectors, as well as the other components.

For added reliability at high temperatures, it is preferable that all systems electronics, such as those used with the system controller and signal processor among others, be comprised primarily of hermetically sealed multi-chip modules (MCMs). MCMs will also serve to eliminate or at least minimize interconnections between integrated circuits and circuit boards, an inherent weakness in high temperature applications. Because very high temperatures tend to radically reduce the lifetime of electronic subassemblies, the preferred embodiment of this invention will allow for the replacement of circuit boards and other subassemblies while enabling the reuse of expensive MCMs and other components.

To increase reliability and resistance to environmental conditions, the electronic components within the housing are preferably reinforced with additional protections. Such electronics may be provided with, for example, legacy ceramic components developed mostly for the military market that serendipitously work at high temperature, multi-chip modules developed (or that can be developed) by end users and others using die known to work at high temperatures and/or silicon-on-insulator (SOI) components. Such reinforced components are commercially available. Additional techniques that may be used to reinforce components include Field Programmable Gate Array (FPGA) and mixed analog/digital devices, long life Gamma Ray GR sensors, high temperature power supplies, telemetry systems compatible with existing systems, high-speed signal processing, sensors to detect high temperatures and real time drilling systems. Other components of the system, such as sensors, electronics, packaging, materials and pressure housings are also preferably rated for high temperature and high pressure conditions.

High temperature electronic components are also provided to generate the reliable operation of this tool. Existing SOI components are used whenever reliable alternatives are not available. In addition, existing Field Programmable Gate Array and mixed signal processes may be used in conjunction with the proposed tool. These processes are, particularly adapted for high-speed data acquisition and signal processing.

The operation of the tool and its components is preferably verified. Specifications for the performance environment or mission profile for this tool may be set for maximum temperature and pressure at an initial interim temperature and pressure (for example about 400 degrees F. (204.44 degrees C.) and about 20 Kpsi (1406.5 kg/cm). Candidate electronic components, subsystems and mechanical assemblies where capable of performing at temperature to ensure operation within established specifications are used. Operation of the system may be verified by thermal analysis using thermal imaging cameras and/or computer-aided thermal modeling thereby verifying proper heat flow and/or sufficient heat dissipation. Virtual qualification, a CAD methodology for assessing and improving the survivability of electronic assemblies through the use of validated failure models may also be implemented.

Test jigs and test housings may be used to verify and qualify high pressure performance of the mechanical and electronic assemblies in high temperature, high pressure test chambers. Exhaustive environmental testing and qualification may be used to determine the maximum temperature limitations of existing and candidate electronics and mechanical components Once candidate electronic components and mechanical assemblies pass initial testing, environmental qualification may also be performed to verify the desired performance. Environmental qualifications preferably consist of temperature and shock qualification testing according to a mission profile. Failures may be analyzed and failure reports generated. Verification of components may include identification, testing and qualification of all control, communications, power and other central or system electronics, sensors, housings, power sources, etc.

Figure 4:
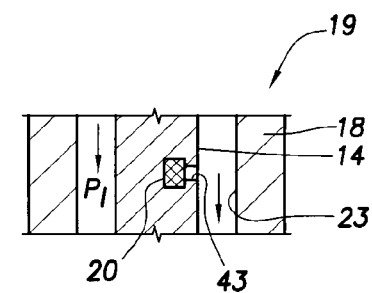
FIG. 4 is a detailed view of the internal sensor of FIG. 2.

FIG. 4 is an enlarged illustration of a portion of the WD system 19 of FIG. 2 depicting the internal sensor in greater detail. This figure illustrates how the internal pressure, or pressure inside the drill collar, is measured. The internal sensor 20 is positioned in the WD tool 14. An orifice 43 extends from the internal sensor 20 to the passage 23 for fluid communication therebetween. The sensor 20 is provided with a pressure gauge exposed to the passage and the internal pressure ($P_I$) contained therein via the orifice.

Figure 5:
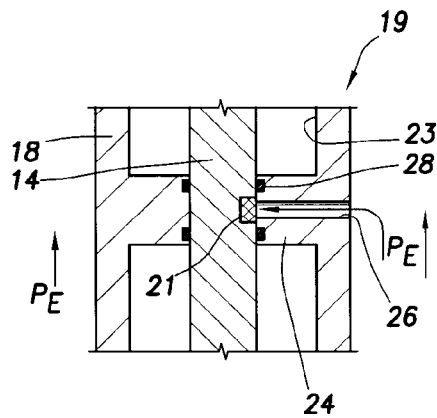
FIG. 5 is a detailed view of the external sensor of FIG. 2.

FIG. 5 is an enlarged illustration of a portion of the WD system 19 of FIG. 2 depicting the external sensor in greater detail. This figure illustrates how the external pressure or annulus pressure outside the drill collar 18 is measured. The external sensor 21 is positioned inside the WD tool 14 adjacent sleeve 24. An orifice 26 extends through the drill collar 18 and sleeve 24, and adjacent sensor 21. A seal or seals 28 is positioned between the sleeve 24 and the WD tool 24 to isolate the orifice and sensor from the passage 23 in the drill collar. The orifice and seal permit fluid communication between the sensor and the exterior of the drill collar. The exterior pressure ($P_E$) outside the drill collar is communicated via the orifice, through the drill collar and sleeve and to the external sensor 21. The external pressure sensor 21 contains a pressure gauge exposed to the pressure in the wellbore.

A pressure seal 28 prevents the external pressure from communicating inside the drill collar. The seal is used to prevent drilling mud from communicating through the orifice 26 and allowing the mud to flow into the tool. Should mud enter the tool through this orifice, the pressure measurement for one or both sensors may be compromised. In addition, drilling mud that communicates through the orifice and into the formation poses the risk of damaging the drill collar through erosion and the formation through mud invasion.

Figure 6:
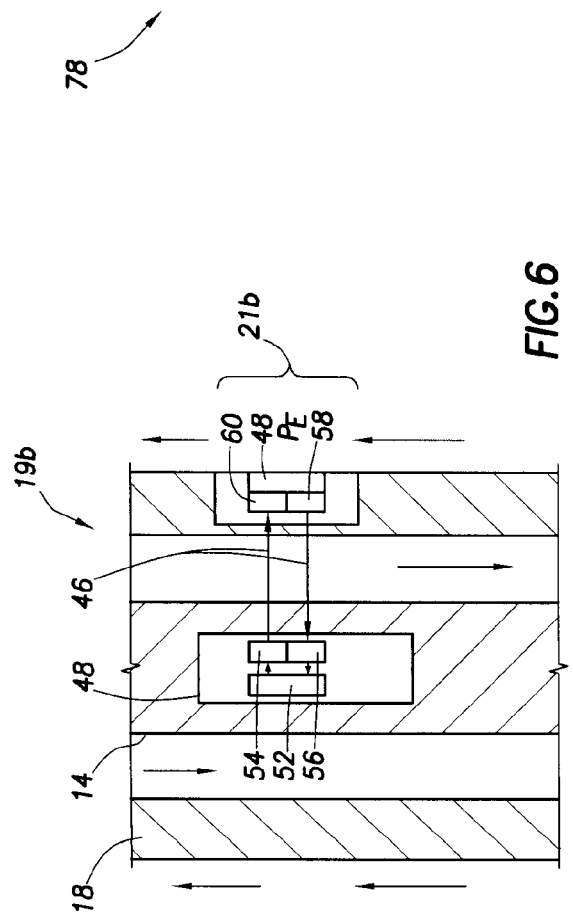
FIG. 6 is a partial cross-sectional view of an alternate embodiment of the while drilling system of FIG. 2, depicting a wireless communication system.

FIG. 6 depicts an alternate embodiment of the WD system 19*b* with wireless communication. In this embodiment, the external sensor 21*b* is a pressure sensor embedded in the drill collar 18 and isolated from passage 23. Because the sensor is embedded in the wall of the drill collar and exposed to the wellbore, the orifice 26 and related seals 28 may be eliminated. The sensor is provided with a gauge 63, in this case a pressure gauge, to measure annular pressure. The sensor may also contain other gauges or sensors to perform various other measurements.

The sensor 21*b* is preferably a wireless sensor adapted to communicate via a wireless link 46 with the WD tool 14. The WD tool 14 is provided with a wireless or non-contact communication system 48 to excite the external sensor to make the pressure measurement and transmit the measurement to the tool. The communication system 48 includes control circuitry 52, a WD transmitter 54 and a WD receiver 56 adapted to control and communicate with the external sensor 21*b*. The WD tool sends a signal via WD transmitter 56 to the pressure sensor. The pressure sensor includes a sensor transmitter 58 and sensor receiver 60 to communicate with the WD tool. The pressure sensor receives commands from the WD tool via the sensor receiver 60, and transmits sensor readings to the WD receiver 56 via the sensor transmitter 58.

Preferably, electromagnetic signals are wirelessly passed between the sensor and the WD tool. An electromagnetic field is generated at the WD transmitter, which is received at the sensor receiver. The sensor then generates a signal sending information to the WD receiver. Other wireless communication systems could be used to convey the signals between the WD tool and the sensors, such as magnetic fields, sonic or ultrasonic pressure waves, visible, infrared or ultraviolet light, among others, and/or combinations of such techniques.

Figure 7:
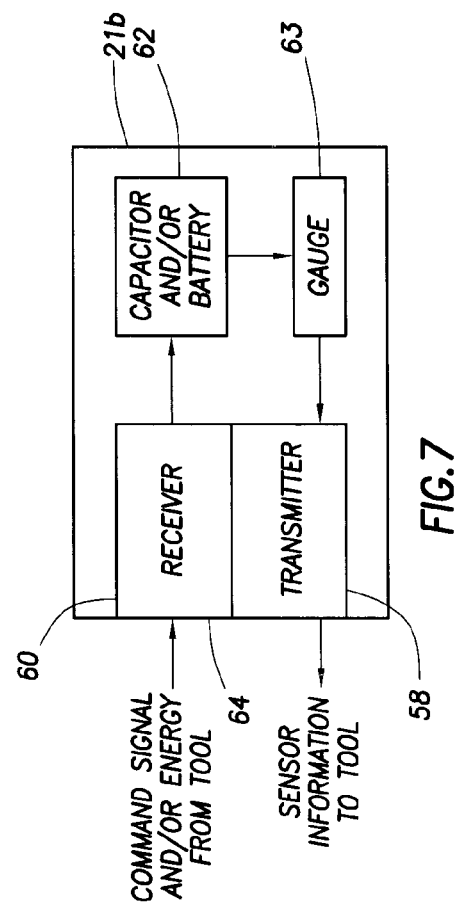
FIG. 7 is a schematic diagram of an alternate embodiment of the wireless communication system of FIG. 6.

As shown in FIG. 7, the WD tool can be adapted to send power and/or communication signals to the sensor. This is accomplished by providing a circuit 62 in the pressure sensor that captures and stores some part or all of the energy transmitted by the WD tool. This energy may then be used to make a measurement and transmit the measurement back to the tool. In some embodiments of the invention, the circuitry 62 may be an energy storage device, such as a capacitor or battery. Alternatively, the circuitry could provide the means to power the sensor from some external source, such as a generator, an alternator, or one or more external batteries (not shown). The transmitter and receiver can be separate or an integrated transceiver adapted to transmit and receive signals.

Figure 8:
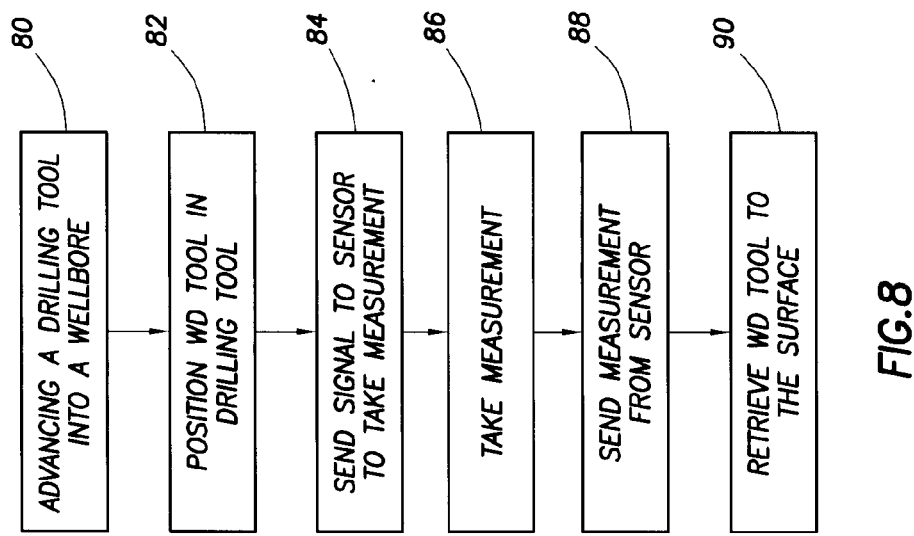
FIG. 8 is a flow diagram of a method of performing downhole measurements with a retrievable WD tool.

FIG. 8 depicts a method 78 of performing downhole measurements using a retrievable WD tool, such as the WD tool depicted in FIGS. 1 and 2. In operation, the drilling tool is advanced into the wellbore 80. The WD tool is positioned in the drilling tool 82. The WD tool may either be positioned in the BHA as the drilling tool is placed in the wellbore, or lowered into the drilling tool via a wireline. A signal is sent from the surface to the WD system to perform the desired operations. The signal may be sent from the surface via mud pulse telemetry to a controller in the WD system. The signal may be a command, calibration and/or power signal to activate the WD system 84. The signal may then be passed from the controller on to the sensors to take a measurement 86.

Once the measurement is taken, the sensor sends the data back to the controller and on to the surface 88. The WD tool may be retrieved from the drilling tool 90. The WD tool may be retrieved separately from the drilling tool, or the entire drilling tool may be removed from the wellbore with the WD tool. The same or a different WD tool may be sent back down into the wellbore for further measurements. This may be done by inserting WD tool back down to the drilling tool and seating it therein, or by sending down an entire drilling tool with WD tool therein.

Preferably, the sensor lies dormant until a measurement is needed. When the WD tool wishes to acquire a sensor signal, it generates and transmits energy to the sensor. The sensor receives this energy and charges the circuitry. When the sensor has received a command and sufficient energy to become active, it takes the desired measurement. The sensor acquires the sensor data and sends this measurement back to the controller. Command and power signals may be passed onto other instruments in the downhole tool.

Embodiments of this invention may require only a portion of the energy sent from the tool to initiate a measurement. The balance of the energy necessary to make and respond with a measurement could come from external power sources as described above. Other embodiments of this invention could require the tool to send a command to the sensor and all power necessary to make the measurement and send it back to the tool could come from energy storage and/or generation means in the drill collar.

Figure 9:
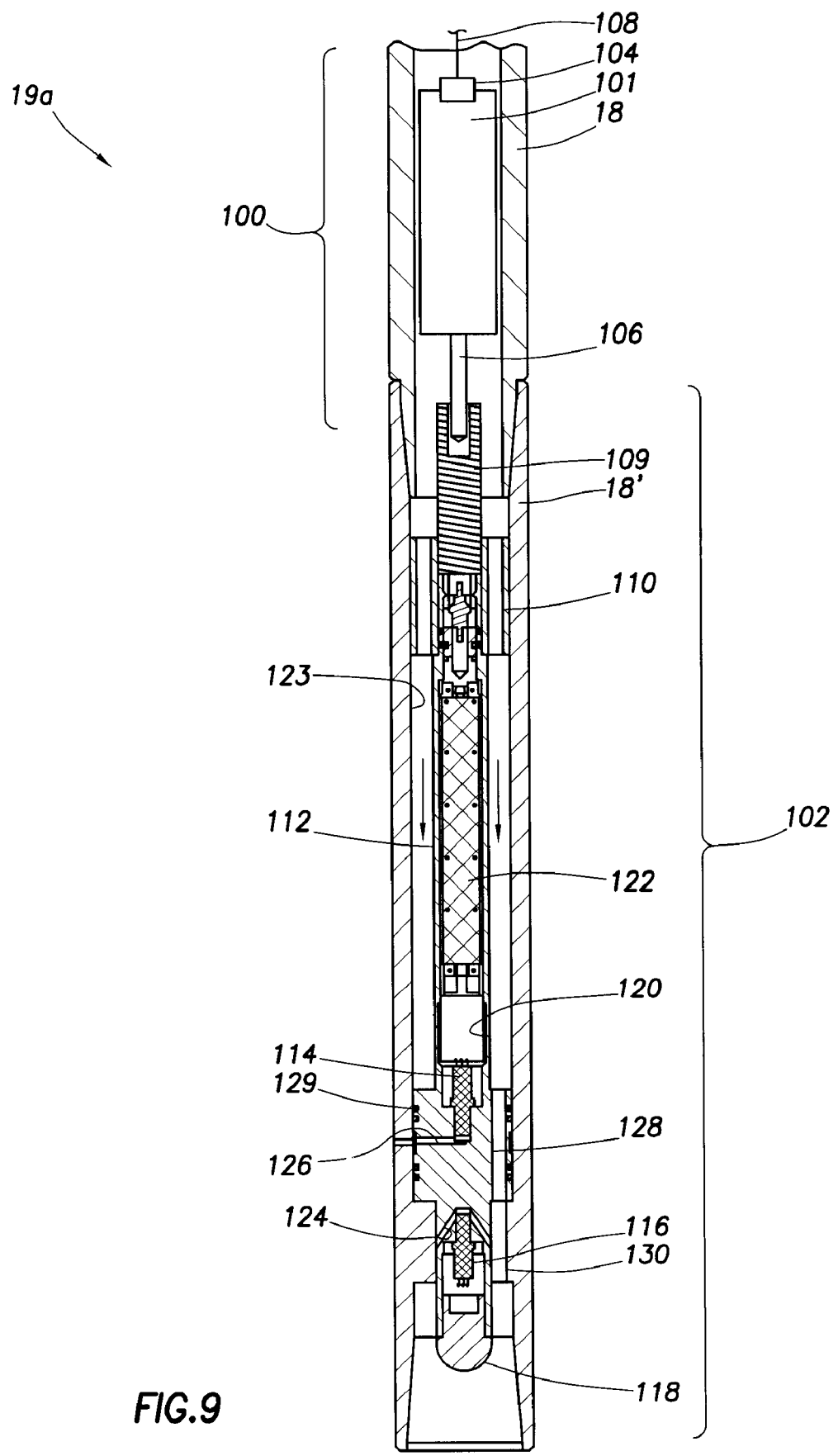
FIG. 9 is a longitudinal cross-sectional view of a WD system with a non-retrievable sensor subassembly, the sensor subassembly having sensors therein.

Referring now to FIG. 9, a WD system 19a usable, for example, in the downhole drilling tool of FIG. 1 is depicted. This WD system includes a WD subassembly 100 positioned in a first drill collar 18 and a sensor subassembly 102 positioned in an adjacent drill collar 18'. The WD subassembly is operatively connected to the sensor subassembly for communication therewith. The sensor subassembly is adapted to take measurements and convey the information to the WD subassembly for transmission to the surface.

The WD subassembly 100 includes a WD tool 101, a retrieval connector 104 and a WD coupler 106. The WD subassembly is preferably retrievable from the drill collar 18 while the downhole tool is in the wellbore using known retrieval mechanisms, such as a cable 108 that releasably connects to retrieval connector 104. The WD tool may be any WD tool such as those described previously herein. The WD subassembly is provided with a WD coupler 106 for operative connection of the WD subassembly to the adjacent sensor subassembly 102. The WD coupler is preferably an induction coupler to establish an electrical link between the WD subassembly and sensor subassembly. This electrical link permits the passing of communication and power signals between the respective subassemblies. Other WD systems, such as telemetry, power and processing systems (not shown), are also preferably provided in the WD subassembly.

The sensor subassembly 102 of FIG. 9 is positioned in drill collar 18' and is preferably non-retrievable therefrom. The sensor subassembly includes a sensor coupler 109, a loading device 110, a chassis 112, an internal pressure sensor 116, an external pressure sensor 114 and an end cap 118. The chassis 112 is preferably a mandrel type, hollow metal housing extending through the drill collar 18'. Loading device 110 is positioned between the chassis and the drill collar to support the chassis in a desired position within the drill collar. Optionally, the loading device may be integral with or separate from the drill collar. A passage 123 extends through the drill collar 18' (and the loading device 110) between the chassis and the drill collar for the passage of mud therethrough. This passage 123 contains an internal pressure ($P_I$).

Figure 10B:
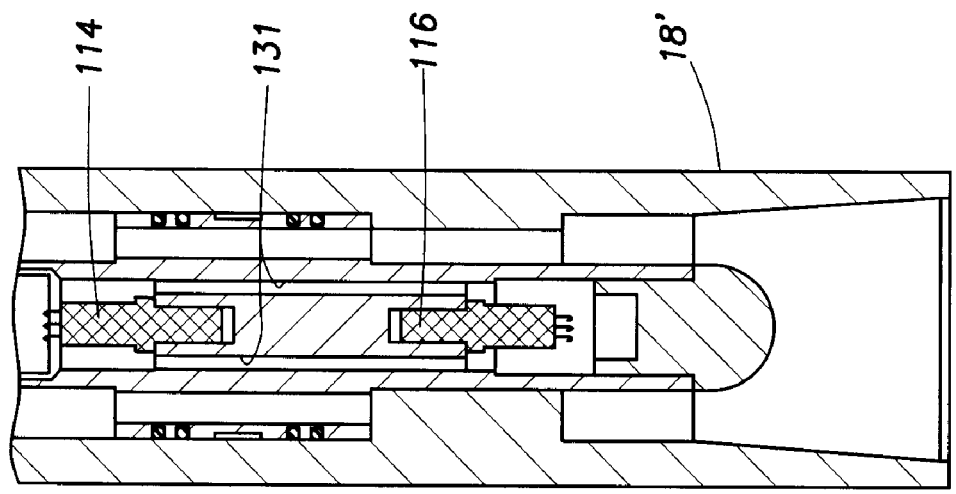
FIG. 10B is an alternate view of the portion of the WD system of FIG. 10A rotated 90 degrees.
Figure 10A:
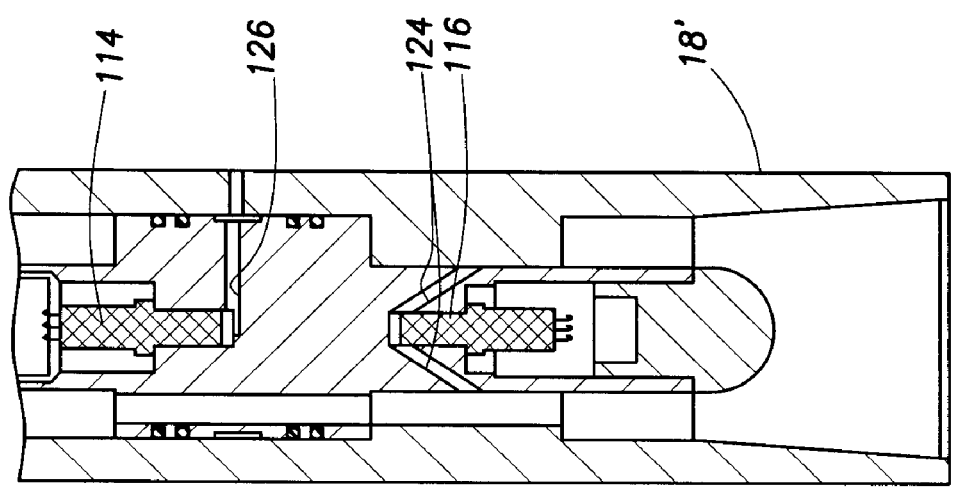
FIG. 10A is a partial cross sectional view of a portion of the WD system of FIG. 9, depicting the sensors in greater detail.

The chassis has a cavity 120 therein for receiving electrical components 122, such as batteries, sensors, wiring or other electronic devices. The electrical components are preferably housed inside the chassis away from drill mud flowing through the passage. The internal sensor 116 and the external sensor 114 are also preferably positioned in the chassis. Internal orifices 124 are provided to expose the internal pressure sensor to the pressure in the passage 123. An external orifice 126 is also provided through the drill collar 18' and the chassis 112 to expose the external sensor 114 to the wellbore pressure. Seals 129 isolate the orifice from the passage 123. The sensors and associated orifices are shown in greater detail in FIGS. 10A and 10B. These figures show the wire channels 131 connecting the sensors 114, 116. These wire channels permit the passage of communication and power signals between the sensors. While the orifices are depicted with a certain number and angle, any angle or number of orifices may be used.

Referring back to FIG. 9, the chassis is provided with a sleeve portion 128 at an opposite end from the loading device 110. This sleeve portion is adapted to assist in positioning the chassis within the downhole tool. The sleeve portion rests against a raised shoulder portion 130 of the drill collar. An end cap 118 is provided at an end of the chassis opposite the coupler for access to the inside of the chassis. The chassis may be an integral unit, or have separate chassis units connected to form the chassis.

The sensor coupler 109 is positioned at an end of the chassis adjacent the WD subassembly. The sensor coupler 109 is adapted to connect with the WD coupler 106. As depicted, the WD coupler 106 is a male coupler adapted for insertion in the female sensor coupler 109. Other connections are envisioned such that proper electrical connection is provided between the respective subassemblies. For example, the WD coupler may be female and the sensor coupler male. Alternative types of mated connectors may also be used.

The electrical link between the WD and sensor couplers enables power and communication signals to pass between the WD subassembly and the sensor subassembly. Preferably, the respective couplers are mated or close together to effect proper operability. Preferably, the connection is also an inductive connection. However, any couplers or electrical link may be used so long as the transmission of signals may pass therebetween. This enables the WD Tool to send commands to the sensor subassembly to take sensor measurements and allows the sensor subassembly to communicate the data collected back to the WD Tool. Additionally, the WD subassembly can pass power to the sensor subassembly to perform operations and/or store energy. The sensor subassembly may be provided with batteries and/or charged by the energy from the WD subassembly.

Figure 11:
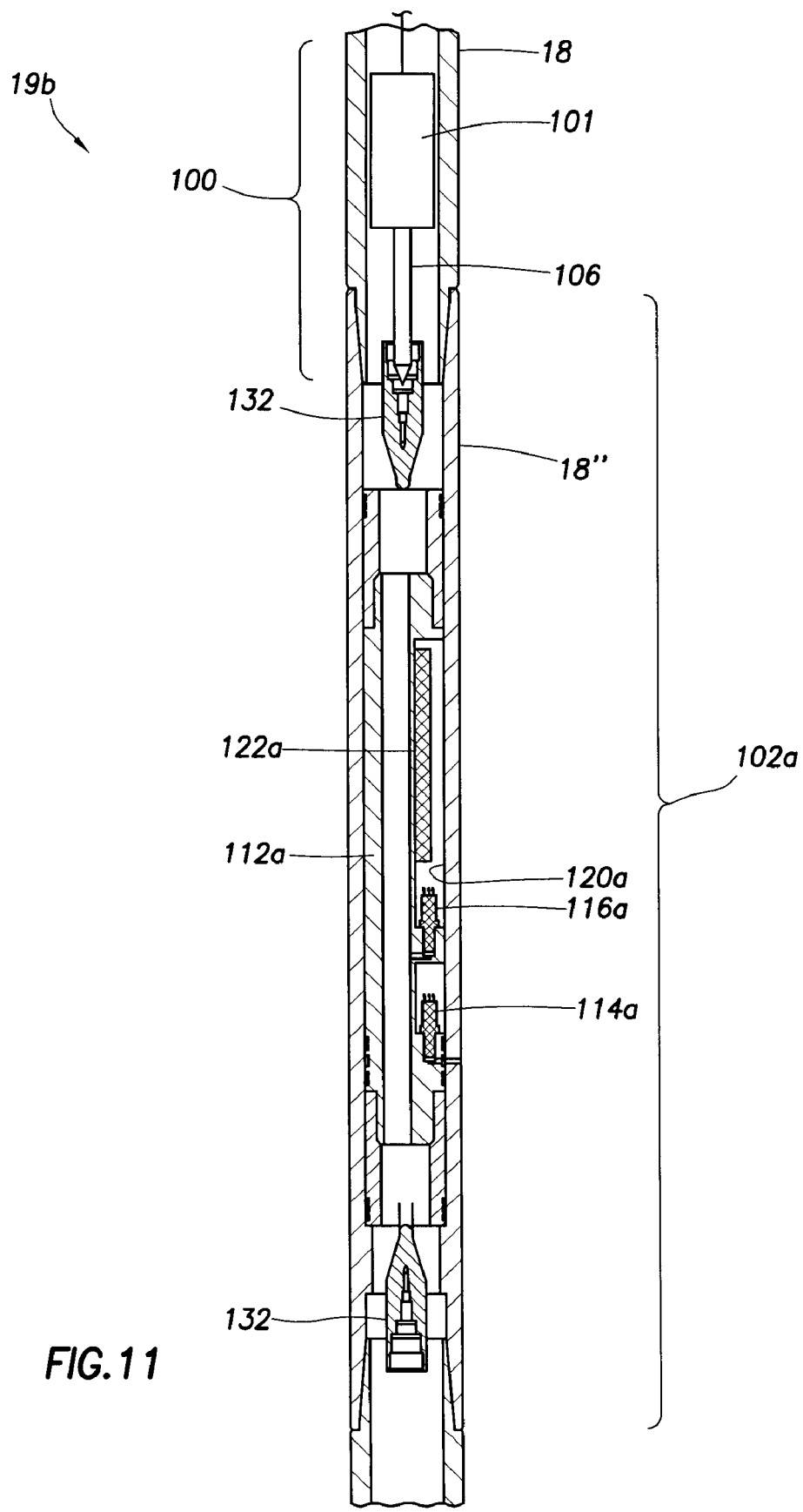
FIG. 11 is a longitudinal cross-sectional view of a sensor subassembly having an annular chassis.

Another configuration of the WD system 19b is depicted in FIG. 11. This configuration can use the same WD subassembly 100 of FIG. 9 operatively connected to a sensor subassembly 102a housed in a drill collar 18". The sensor subassembly 102a includes an annular chassis 112a with flow diverters 132 at each end thereof to enable passage of fluid therethrough. In this embodiment, the electronics (122a) and sensors (114a, 116a) are housed in a cavity 120a between the chassis and the drill collar.

The WD system may be provided with one or more flow diverters 132. The flow diverters 132 are preferably inductive couplers adapted to receive the mated inductive coupler 106 of the WD subassembly for passing signals therebetween.

The sensors depicted in FIGS. 9–11 are preferably pressure sensors adapted to measure downhole pressures. However, it will be appreciated by one of skill in the art that any sensor, such as a strain gauge, could be used. It will also be appreciated that any number, configuration or combination of internal and/or external sensors could be used. Additionally, more than one induction link could also be used. The sensor and WD subassemblies and their respective components may be rearranged and/or repositioned in one or more drill collars. For example, the induction link and associated couplers could be located on the uphole or downhole end of the chassis, the sensor chassis and the electronics may be inserted into the WD collar or into a separate sub above or below the WD tool, and the sensor chassis may be located at the above or below the WD tool.

Figures 12, 13:
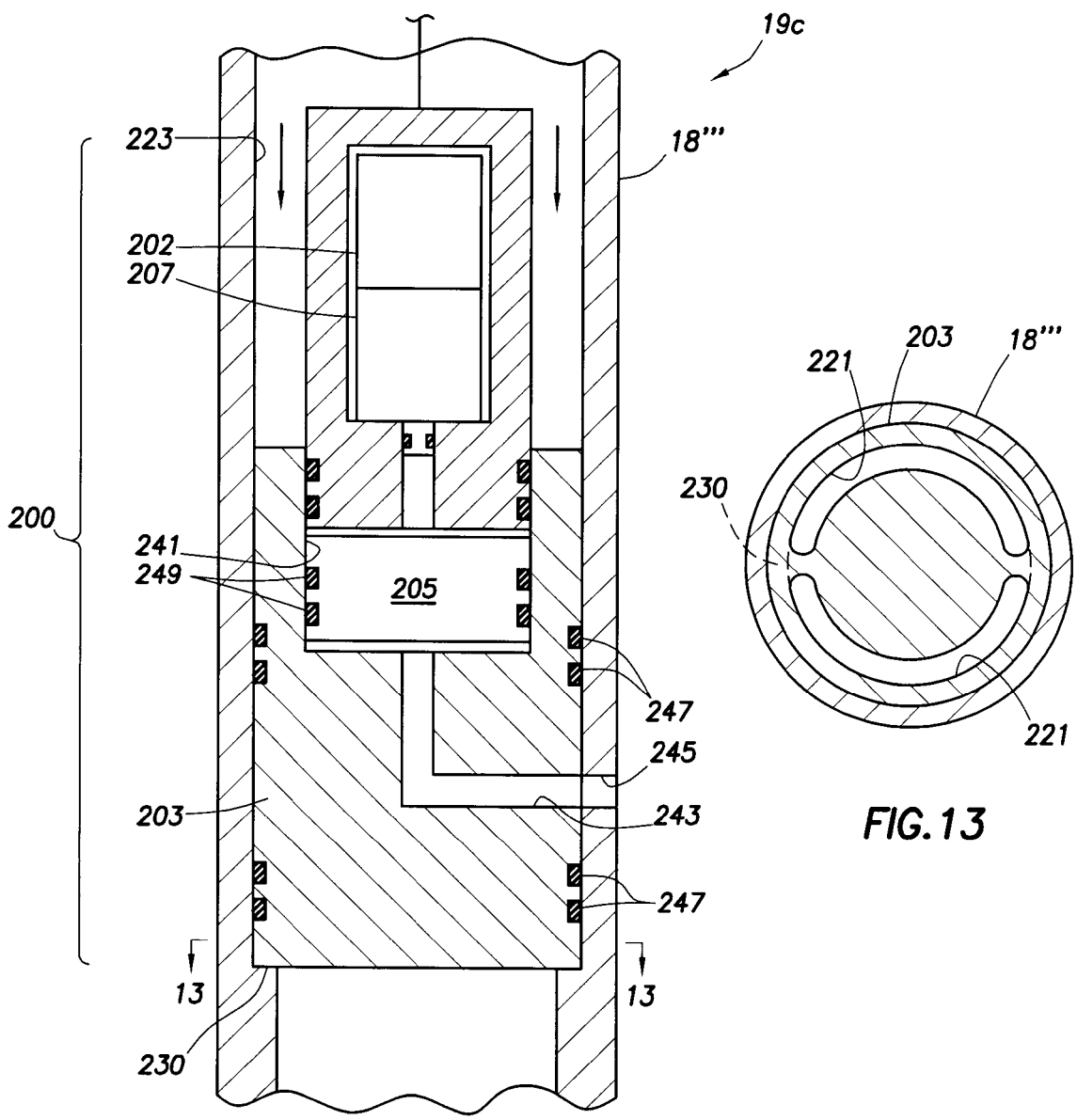
FIG. 12 is a longitudinal cross-sectional view of a WD system with a retrievable WD tool positioned in a landing collar.
FIG. 13 is a lateral cross-sectional view of the WD system of FIG. 12 taken along line 13—13.

FIG. 12 depicts an alternate WD system 19c including a retrievable, combined WD and sensor system 200 housed in a drill collar 18'". The WD and sensor system 200 includes a WD tool 202, a landing collar 203, a flow restrictor 205 and a sensor 207. The WD tool is positioned in the drill collar and supported in the landing collar. A passage 223 extends through the drill collar and the landing collar to permit the flow of fluid therethrough. The landing collar is preferably a hollow cylinder having a plurality of channels 221 for the flow of fluid therethrough. A cross section of the landing collar taken along line 13—13 of FIG. 12 is shown in FIG. 13. The landing collar rests against a shoulder 230 in the drill collar.

The landing collar is provided with a pocket 241 in an end thereof. The pocket 241 is adapted to receive the WD Tool 202. A landing orifice 243 extends from the pocket and through the landing collar. A drill collar orifice 245 extends through the drill collar and adjacent the landing orifice 243 for fluid communication therebetween. Seals 247 are positioned between the landing collar and the drill collar and seals 249 are positioned between the flow restrictor and the landing collar to isolate the orifice from the passage 223. The seals 249 about the WD tool may also assist in seating the WD tool within the pocket.

The flow restrictor may be a valve or other restrictor adapted to selectively permit fluid flow therethrough. The flow restrictor may be a valve, choke, orifice or other restrictor capable of creating a pressure change. Fluid selectively passes from the wellbore, through the orifices, past the flow restrictor and into the pocket 241.

When the WD tool is seated in the pocket 241, the restrictor is open to expose the pocket to pressure from the wellbore. The sensor measures the pressure in the pocket and, therefore, the wellbore. When the WD tool is unseated, or removed from the pocket, the restrictor is closed to prevent the flow of fluid from the wellbore into the passage. The pressure sensor is then exposed to the pressure in the passage 223 and, therefore, measures the internal pressure.

In some cases, the restrictor may be a choke. In such a case, when the WD tool is unseated from the pocket, there will be flow through the choke and, therefore, a pressure drop across the choke. The pressure in the passage is the internal pressure measured by the sensor. When the WD tool is seated in the pocket, fluid is prevented from flowing from the wellbore into the pocket and the pressure measured by the sensor is the external pressure ($P_E$).

The WD tool and pressure sensor are preferably retrievable from the downhole tool via a connection and cable system. In this embodiment, both the WD tool and the one or more pressure sensors housed therein are retrievable to the surface. The WD tool and/or sensors may then be sent back downhole and reseated as desired.

It will be understood from the foregoing description that various modifications and changes may be made in the preferred and alternative embodiments of the present invention without departing from its true spirit. For example, while the sensor is described in at least some aspects as being a pressure sensor, it will be appreciated that any type of sensor may be used, such as temperature, density, flow rate, etc.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

The invention claimed is:

1. A while drilling system for determining downhole parameters, the system positioned in a downhole drilling tool suspended in a wellbore, the system comprising:
   a retrievable while drilling tool positionable in the downhole drilling tool, the while drilling tool having a first communication coupler at an end thereof;

a sensor chassis supported in the drilling tool, the sensor chassis having a second communication coupler at an end thereof for operative connection with the first communication coupler; and at least one sensor positioned in the chassis, the at least one sensor adapted to measure one of internal parameters of the drilling tool, external parameter in the wellbore and combinations thereof, the sensor operatively connected to the while drilling tool via the communication coupler for communication therebetween, wherein the at least one sensor comprises one of an internal pressure sensor, an external pressure sensor and combinations thereof.

2. The while drilling system of claim 1 further comprising at least one sleeve adapted to support the chassis within the drill collar.

3. The while drilling system of claim 2 wherein the at least one sleeve is a loading device.

4. The while drilling system of claim 1 further comprising an end cap removably insertable into an end of the chassis.

5. The while drilling system of claim 1 wherein the couplers are induction couplers.

6. The while drilling system of claim 1 wherein the chassis is positioned within the drill collar such that a mud flows between an outer surface of the chassis and the drill collar.

7. The while drilling system of claim 1 wherein the chassis is positioned within the drill collar such that a mud flows through a passage in the chassis.

8. The while drilling system of claim 7 further comprising at least one flow diverter at an end of the chassis.

9. The while drilling system of claim 7 wherein the second coupler is a flow diverter.

10. The while drilling system of claim 1 wherein the at least one sensor measures one of gamma ray, shock, vibration, pressure, temperature, sonic speed, arrival time and combinations thereof.

11. The while drilling system of claim 1 wherein the chassis has an internal orifice extending from the internal pressure sensor to a passage extending trough the drill collar.

12. The while drilling system of claim 1 wherein the chassis has an external orifice extending from the external pressure sensor to the wellbore.

13. The while drilling system of claim 1 further comprising telemetry for communicating with a surface unit.

14. A while drilling system for determining downhole parameters, the system positioned in a downhole drilling tool suspended in a wellbore, the system comprising:

a retrievable while drilling tool positionable in the downhole drilling tool, the while drilling tool having at least one sensor therein;

a landing collar positioned in the drill collar, the landing collar having a pocket adapted to receive the while drilling tool, the landing collar having an orifice therethrough in fluid communication with the wellbore via an aperture through the downhole drilling tool;

a flow restrictor positioned in the pocket, the flow restrictor adapted to selectively permit the flow of fluid into the pocket via the orifice.

15. The while drilling system of claim 14 wherein the flow restrictor is one of a choke, a valve, and combinations thereof.

16. The while drilling system of claim 14 wherein the sensor is adapted to measure one of gamma ray, shock, vibration, pressure, temperature, sonic speed, arrival time and combinations thereof.

17. The while drilling system of claim 14 wherein the while drilling tool is selectively reseatable in the pocket.

18. The while drilling system of claim 14 wherein a loading device is integral with the drill collar.

19. The while drilling system of claim 14 wherein a loading device is positioned in the drill collar with seals therebetween.

20. A method of measuring downhole parameters while drilling, comprising:

advancing a downhole drilling tool into the earth to form a wellbore, the downhole drilling tool having a chassis therein with at least one sensor therein;

seating a while drilling tool in the downhole drilling tool;

operatively connecting the while drilling tool to the chassis for wireless communication between the sensors and the while drilling tool;

sensing wellbore parameters via the at least one sensor; and selectively exposing the at least one sensor to one of an internal pressure of the drilling tool, an external pressure about the drilling tool and combinations thereof.

21. The method of claim 20 further comprising selectively retrieving the while drilling tool from the downhole drilling tool.

22. The method of claim 20 further comprising passing signals between the while drilling tool and a surface unit.

23. The method of claim 20 further comprising selectively positioning the chassis within the drilling tool via a loading device.

24. A method of measuring downhole parameters while drilling, comprising:

advancing a downhole drilling tool into the earth to form a wellbore, the downhole drilling tool having a landing collar therein;

seating a while drilling tool in a pocket in the landing collar, the while drilling tool having at least one sensor therein;

selectively establishing fluid communication between the pocket and the wellbore via an orifice in one of the downhole tool, the landing collar and combinations thereof; and sensing wellbore parameters in the pocket via the at least one sensor.

25. The method of claim 24 further comprising positioning a valve in the pocket to selectively permit fluid to pass through the orifice.

26. The method of claim 24 further comprising selectively retrieving the while drilling tool from the downhole drilling tool.

* * * * *